US011269499B2

(12) United States Patent
Kondo

(10) Patent No.: US 11,269,499 B2
(45) Date of Patent: Mar. 8, 2022

(54) ELECTRONIC APPARATUS AND CONTROL METHOD FOR FINE ITEM MOVEMENT ADJUSTMENT

(71) Applicant: CANON KABUSHIKI KAISHA, Tokyo (JP)

(72) Inventor: Emi Kondo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/115,258

(22) Filed: Dec. 8, 2020

(65) Prior Publication Data

US 2021/0173536 A1 Jun. 10, 2021

(30) Foreign Application Priority Data

Dec. 10, 2019 (JP) .............................. JP2019-223002

(51) Int. Cl.
G06F 3/0484 (2013.01)
G06F 3/0488 (2022.01)
G06F 3/0482 (2013.01)

(52) U.S. Cl.
CPC .......... *G06F 3/0484* (2013.01); *G06F 3/0482* (2013.01); *G06F 3/0488* (2013.01)

(58) Field of Classification Search
CPC .... G06F 3/0484; G06F 3/0482; G06F 3/0488; G06F 3/0481; G06F 3/048
See application file for complete search history.

(56) References Cited

U.S. PATENT DOCUMENTS

| 5,666,113 A * | 9/1997 | Logan | G06F 3/0488 341/22 |
| 5,825,352 A * | 10/1998 | Bisset | G06F 3/04186 345/173 |
| 5,867,158 A * | 2/1999 | Murasaki | G06F 3/0485 715/784 |
| 6,559,833 B2 * | 5/2003 | Rowe | G06F 1/1616 345/156 |
| 7,050,925 B2 * | 5/2006 | Simakov | G05B 19/4097 702/127 |
| 7,269,531 B2 * | 9/2007 | Brouhon | G06F 3/0321 702/150 |

(Continued)

FOREIGN PATENT DOCUMENTS

| JP | 2018-013745 A | 1/2018 |
| JP | 2018-206088 A | 12/2018 |

*Primary Examiner* — Jung-Mu T Chuang
(74) *Attorney, Agent, or Firm* — Cowan, Liebowitz & Latman, P.C.

(57) ABSTRACT

An electronic apparatus performs control such that an item to be displayed in a display unit is displayed so as to move according to a touch operation, and performs control to not move the position of the item displayed in the display unit even if a touch operation has been started, and, in response to a movement of a touch position having been detected, move the item from the position at which the item was displayed in accordance with a movement amount of the touch position, and after the touch position has been moved, when a position of the touch panel that is in a first direction from a set reference position of the touch panel is tapped, move the item in the first direction by an amount corresponding to a predetermined amount, every time a tap is performed.

8 Claims, 12 Drawing Sheets

(56) References Cited

U.S. PATENT DOCUMENTS

| | | | |
|---|---|---|---|
| 7,800,593 B2* | 9/2010 | Ohta | A63F 13/214 |
| | | | 345/173 |
| 8,451,236 B2* | 5/2013 | Duarte | G06F 3/0488 |
| | | | 345/173 |
| 8,539,386 B2* | 9/2013 | Capela | G06F 3/0488 |
| | | | 715/863 |
| 8,547,468 B2* | 10/2013 | Churei | H04N 5/23293 |
| | | | 348/333.06 |
| 9,317,131 B2* | 4/2016 | Glazer | G06F 3/04845 |
| 9,513,700 B2* | 12/2016 | Weising | G06F 3/012 |
| 9,588,607 B2* | 3/2017 | Kim | G06F 3/04883 |
| 9,626,071 B2* | 4/2017 | Lee | G06F 3/04817 |
| 9,671,878 B2* | 6/2017 | Matsuda | G06F 3/04817 |
| 9,785,330 B1* | 10/2017 | Yang | G06F 3/0488 |
| 10,649,645 B2* | 5/2020 | Ueguri | G06F 3/0484 |
| 2003/0048259 A1* | 3/2003 | Rowe | G06F 1/1616 |
| | | | 345/173 |
| 2004/0135776 A1* | 7/2004 | Brouhon | G06F 3/03545 |
| | | | 345/179 |
| 2005/0038624 A1* | 2/2005 | Simakov | G05B 19/4097 |
| | | | 702/127 |
| 2006/0244735 A1* | 11/2006 | Wilson | G06F 3/0488 |
| | | | 345/173 |
| 2007/0008298 A1* | 1/2007 | Ohta | A63F 13/214 |
| | | | 345/173 |
| 2007/0168890 A1* | 7/2007 | Zhao | G06F 3/04883 |
| | | | 715/863 |
| 2007/0192731 A1* | 8/2007 | Townsend | G06F 3/0488 |
| | | | 715/788 |
| 2007/0262964 A1* | 11/2007 | Zotov | G06F 3/04883 |
| | | | 345/173 |
| 2008/0309626 A1* | 12/2008 | Westerman | G06F 3/04883 |
| | | | 345/173 |
| 2009/0205878 A1* | 8/2009 | Taylor | G06F 3/03547 |
| | | | 178/18.03 |
| 2009/0278806 A1* | 11/2009 | Duarte | G06F 3/03547 |
| | | | 345/173 |
| 2010/0011315 A1* | 1/2010 | Araki | G06F 3/0485 |
| | | | 715/783 |
| 2010/0156813 A1* | 6/2010 | Duarte | G06F 3/0488 |
| | | | 345/173 |
| 2010/0238115 A1* | 9/2010 | Komaarashi | G06F 3/016 |
| | | | 345/168 |
| 2010/0238129 A1* | 9/2010 | Nakanishi | G06F 3/016 |
| | | | 345/173 |
| 2011/0181529 A1* | 7/2011 | Capela | G06F 3/0488 |
| | | | 345/173 |
| 2011/0219323 A1* | 9/2011 | Woo | G06F 3/048 |
| | | | 715/769 |
| 2011/0249165 A1* | 10/2011 | Churei | H04N 5/23293 |
| | | | 348/333.02 |
| 2012/0096393 A1* | 4/2012 | Shim | G06F 3/0485 |
| | | | 715/784 |
| 2013/0024821 A1* | 1/2013 | Lee | G06F 3/04817 |
| | | | 715/863 |
| 2013/0176214 A1* | 7/2013 | Chao | G06F 3/0488 |
| | | | 345/157 |
| 2013/0212541 A1* | 8/2013 | Dolenc | G06F 3/017 |
| | | | 715/863 |
| 2013/0342485 A1* | 12/2013 | Kim | G06F 3/041 |
| | | | 345/173 |
| 2014/0155157 A1* | 6/2014 | Hazama | A63F 13/533 |
| | | | 463/31 |
| 2014/0232652 A1* | 8/2014 | Weising | G06T 7/70 |
| | | | 345/158 |
| 2014/0254826 A1* | 9/2014 | Allen | G10H 3/186 |
| | | | 381/98 |
| 2014/0347308 A1* | 11/2014 | Glazer | G06F 3/0488 |
| | | | 345/173 |
| 2014/0351724 A1* | 11/2014 | Kim | G06F 3/04883 |
| | | | 715/765 |
| 2015/0026619 A1* | 1/2015 | Lee | G06F 3/04845 |
| | | | 715/769 |
| 2015/0138101 A1* | 5/2015 | Park | G06F 3/04883 |
| | | | 345/173 |
| 2015/0355735 A1* | 12/2015 | Matsuda | G06F 3/0488 |
| | | | 345/162 |
| 2016/0047661 A1* | 2/2016 | Yeo | G01C 21/3641 |
| | | | 701/430 |
| 2016/0299649 A1* | 10/2016 | Fujita | G06F 3/0483 |
| 2017/0001567 A1* | 1/2017 | Koyama | H04N 5/247 |
| 2017/0003796 A1* | 1/2017 | Kono | G06F 3/0485 |
| 2017/0003837 A1* | 1/2017 | Shamonsky | G06F 3/04886 |
| 2017/0308197 A1* | 10/2017 | Campbell | G06F 3/0418 |
| 2018/0310224 A1* | 10/2018 | Hardee | H04W 40/20 |
| 2018/0314403 A1* | 11/2018 | Kukita | F24H 1/00 |
| 2018/0348982 A1* | 12/2018 | Ueguri | G06F 3/0482 |
| 2019/0158761 A1* | 5/2019 | Sasai | H04N 5/232935 |
| 2019/0391736 A1* | 12/2019 | Tanaka | G06F 3/016 |
| 2020/0250823 A1* | 8/2020 | Yamamoto | G06T 7/0014 |
| 2021/0173536 A1* | 6/2021 | Kondo | G06F 3/0484 |

\* cited by examiner

TOUCH PANEL 270a
OPERATION SURFACE

BACKSIDE DISPLAY UNIT 101
DISPLAY SURFACE

FIG. 7A

| SHOOTING | REPRODUCING | SETTING | AF | | |
|---|---|---|---|---|---|
| TOUCH & DRAG SETTING | | | | | 702 |
| AF OPERATION | | | ONE SHOT | | 703 |
| AF TYPE | | | 1 POINT ☐ | | 704 |
| CONTINUOUS AF | | | NOT | | 705 |
| MOVING IMAGE SERVO AF | | | DO | | 706 |

| TOUCH & DRAG AF SETTING | | 720 |
|---|---|---|
| TOUCH & DRAG AF | DO | 721 |
| POSITION DESIGNATION METHOD | RELATIVE POSITION | 722 |
| TOUCH REGION | UPPER RIGHT | 723 |
| REFERENCE POINT SETTING | | 724 |

ELECTRONIC APPARATUS AND CONTROL METHOD FOR FINE ITEM MOVEMENT ADJUSTMENT

BACKGROUND OF THE INVENTION

Field of the Invention

The present invention relates to techniques for improving operability of a touch panel.

Description of the Related Art

When a user performs shooing while looking through a viewfinder, there are cases where the user performs operations for bringing a desired subject into focus by moving an AF frame while looking through the viewfinder, Japanese Patent Laid-Open No. 2018-206088 discloses a technique in which, if a touch-down operation is performed on a touch panel, and a touch-move operation is performed upward for a predetermined distance or more, the setting can be finely adjusted regardless of the distance of the touch-move operation. Japanese Patent Laid-Open No. 2018-013745 discloses a technique in which, when a user looks through a viewfinder, the user can perform an absolute positional movement of an AF frame displayed in the viewfinder by performing a double tap operation on a touch panel, and can perform a relative positional movement of the AF frame by performing a touch-move operation on the touch panel.

In the technique disclosed in Japanese Patent Laid-Open No. 2018-206088, fine adjustment of the item position can only be performed unidirectionally. In the technique disclosed in Japanese Patent Laid-Open No. 2018-013745, there are cases where, even if the double tap operation is performed when the current item setting is to be finely adjusted, the user cannot touch the intended position, and when the touch-move operation is performed, it is difficult for the user to minutely move the touch position, and therefore it is possible that an unintended setting is configured.

SUMMARY OF THE INVENTION

The present invention has been made in consideration of the aforementioned problems, and realizes techniques for a user to be able to perform fine adjustment of the display position of an item using a touch panel, with high operability.

In order to solve the aforementioned problems, the present invention provides an electronic apparatus comprising: a touch detection unit configured to be able to detect a touch operation performed on a touch panel; a display control unit configured to perform control such that an item to be displayed in a display unit is displayed so as to move according to a touch operation; and a control unit configured to perform control to not move the position of the item displayed in the display unit even if a touch operation has been started, and, in response to a movement of a touch position having been detected, move the item from the position at which the item was displayed in accordance with a movement amount of the touch position, and after the touch position has been moved, when a position of the touch panel that is in a first direction from a set reference position of the touch panel is tapped, move the item in the first direction by an amount corresponding to a predetermined amount, every time a tap is performed.

In order to solve the aforementioned problems, the present invention provides a method of controlling an electronic apparatus that includes a touch detection unit configured to be able to detect a touch operation performed on a touch panel, such that an item to be displayed in a display unit is displayed so as to move according to a touch operation, the method comprising: performing control to not move the position of the item displayed in the display unit even if a touch operation has been started, and, in response to a movement of a touch position having been detected, move the item from the position at which the item was displayed in accordance with a movement amount of the touch position, and after the touch position has been moved, when a position of the touch panel that is in a first direction from a set reference position of the touch panel is tapped, move the item in the first direction by an amount corresponding to a predetermined amount, every time a tap is performed.

In order to solve the aforementioned problems, the present invention provides a non-transitory computer-readable storage medium storing a program for causing a computer to execute a method of controlling an electronic apparatus that includes a touch detection unit configured to be able to detect a touch operation performed on a touch panel, such that an item to be displayed in a display unit is displayed so as to move according to a touch operation, the method comprising: performing control to not move the position of the item displayed in the display unit even if a touch operation has been started, and, in response to a movement of a touch position having been detected, move the item from the position at which the item was displayed in accordance with a movement amount of the touch position, and after the touch position has been moved, when a position of the touch panel that is in a first direction from a set reference position of the touch panel is tapped, move the item in the first direction by an amount corresponding to a predetermined amount, every time a tap is performed.

Further features of the present invention will become apparent from the following description of exemplary embodiments (with reference to the attached drawings).

BRIEF DESCRIPTION OF THE DRAWINGS

FIGS. 7A-7D are diagrams illustrating exemplary displays of menu screens, of the present embodiment.

DESCRIPTION OF THE EMBODIMENTS

Figure 1A:
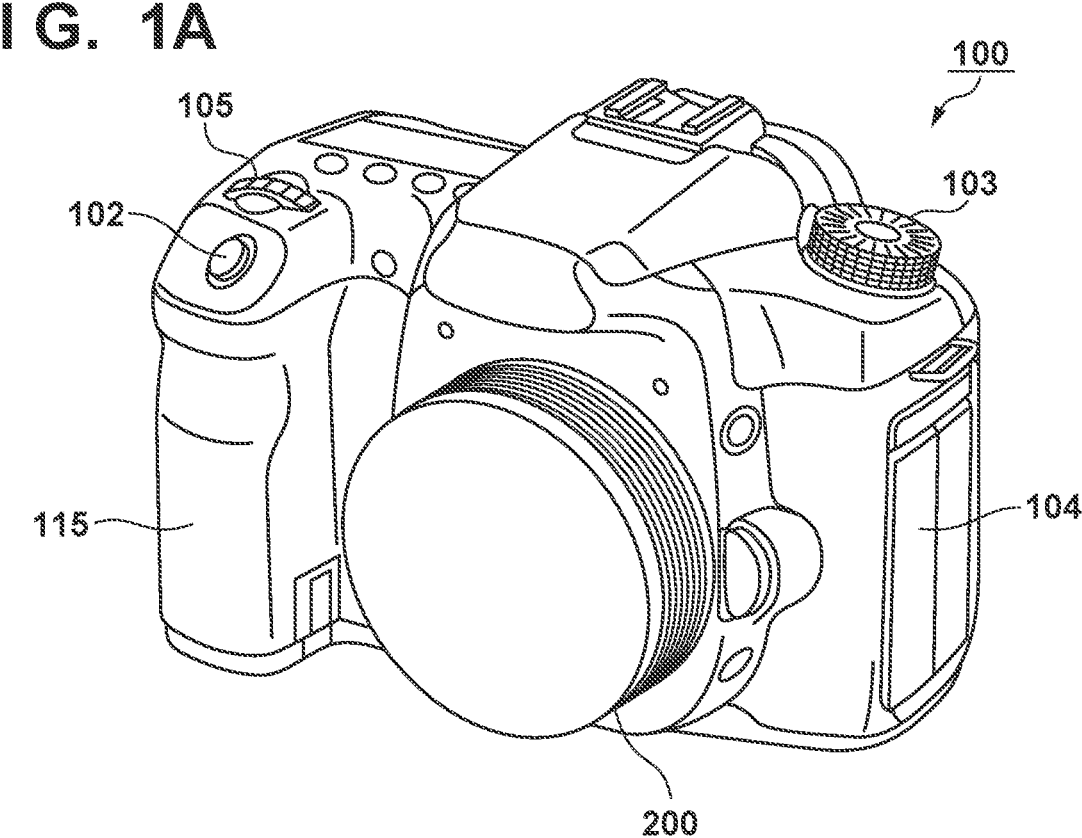
FIG. 1A is a front perspective view of an apparatus of a present embodiment.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Although the embodiments describe a plurality of features, not all of these features are necessarily essential for the invention, and the features may also be combined in any manner. Furthermore, in the attached drawings, the same or similar constituent elements are assigned the same reference numerals, and redundant descriptions are omitted.

First Embodiment

Hereinafter, embodiments in which an electronic apparatus of the present invention is applied to a single-lens reflex digital camera which is capable of shooting a still image and/or a moving image will be described in detail with reference to the accompanying drawings.

Apparatus Configuration

The configuration and functions of digital camera 100 according to the present embodiment will be described below with reference to FIGS. 1A, 1B and 2

Figure 1B:
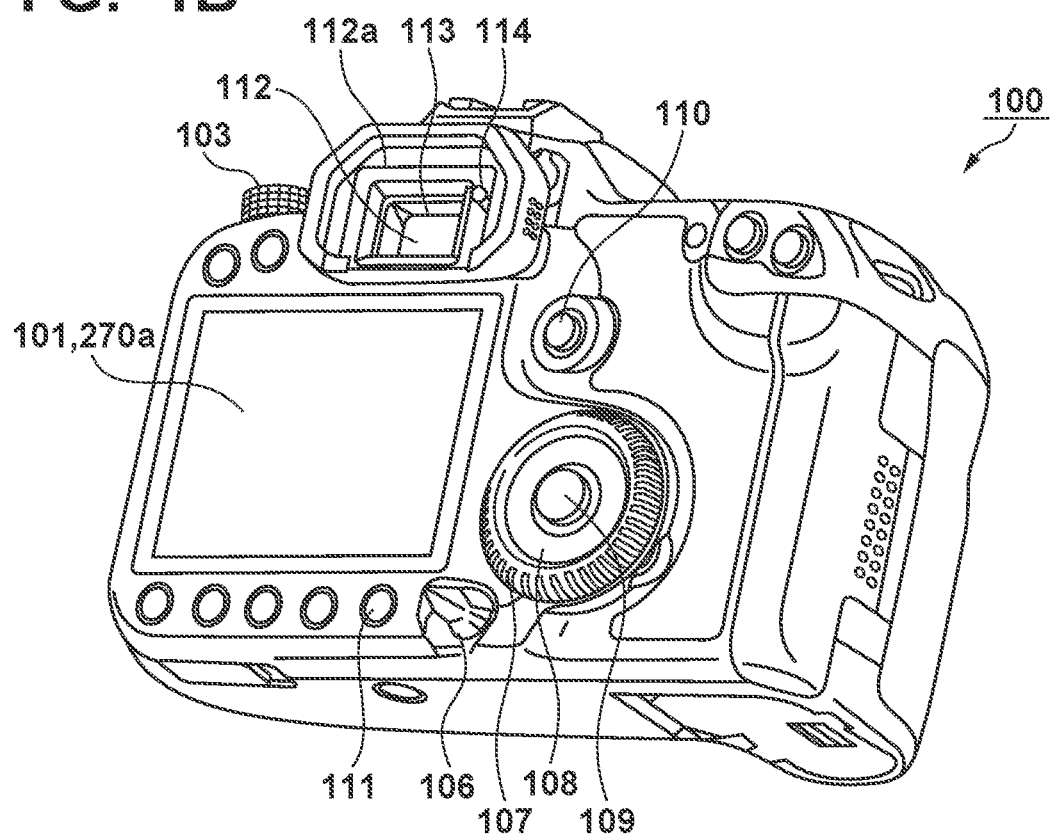
FIG. 1B is a hack perspective view of the apparatus of the present embodiment.

FIG. 1A is a front perspective view of the digital camera 100, and FIG. 1B is a hack perspective view of the digital camera 100.

In FIGS. 1A and 1B, a backside display unit 101 is a display device, such as an LCD, provided on the back surface of the camera body, for displaying images and various types of information. Moreover, the backside display unit 101 has a function of reproducing a still image after the still image was shot, a function of displaying a moving image that is being recorded, and a live view display (through-the-lens display) function as well. A touch panel (touch screen) 270a is provided on the backside display unit 101. The touch panel 270a is a touch detection device that can detect a contact (touch operation) on the display surface of the backside display unit 101 (operation surface of the touch panel 270a).

A shutter-release button 102 is an operation unit for giving a shooting instruction. A mode selection switch 103 is a dial type operation unit for switching between various modes. A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is also a rotating operation member included in the operation units 270 that will be described later with reference to FIG. 2, and can move a selected frame, scroll images, and the like. A cross key 108 is a movement instruction member included in the operation units 270 that will be described later with reference to FIG. 2, and can perform, by one of four-directional buttons constituted by UP, DOWN, LEFT and RIGHT being pressed down, an operation that corresponds to the pressed portion of the cross key 108.

A SET button 109 is also a push button type operation member included in the operation units 270 that will be described later with reference to FIG. 2, and is mainly used for determining a selection item. A live view button 110 is also a push button included in the operation units 270 that will be described later with reference to FIG. 2, and is used for the switching on/off of live view (hereinafter, it may be referred to as "LV") display in a still image shooting mode, and is used for giving an instruction to start or stop moving image shooting (recording) in a moving image recording mode. A reproduction button 111 is also a push-button type operation member included in the operation units 270 that will be described later with reference to FIG. 2, and is used to switch between the shooting mode and the reproduction mode. By pressing the reproduction button 111 during the shooting mode, the operation mode is switched to the reproduction mode, and the latest image among the images recorded on a recording medium 250 can be displayed on the backside display unit 101. Note that the shutter-release button 102, the main electronic dial 105, the power supply switch 106, the sub electronic dial 107, the cross key 108, the SET button 109, LV button 110, and the reproduction button 111 are included in the operation unit 270. A grip portion 115 has a shape that makes it easy to be grasped by a user's a right hand when he or she holds the digital camera 100. The shutter-release button 102 and the main electronic dial 105 are arranged at positions where the grip portion 115 can be operated by the index finger of the right hand while holding the digital camera 100 by gripping the grip portion 115 with the little finger, the ring finger and the middle finger of the right hand. In the same state, the sub electronic dial 107 is arranged at a position operable with the thumb of the right hand.

The user can view a subject image through an optical viewfinder (OVF) by looking into a viewfinder 112 (visually recognizable). An eye approach detection unit 114 is object detection unit for detecting (eye approach detection, approach detection) that an object has approached to a distance that is less than a predetermined distance such as 1 cm or 2 cm (less than the predetermined distance). For example, when the user brings his/her eye close to the viewfinder 112 in order to view an in-finder display unit 113 (look through an eyepiece part 112a), and the eye approach detection unit 114 detects the approach of an object (eye), the user can view the display of the in-finder display unit 113 in a manner of being superimposed on a subject seen through the OVF. Also, when the eye approach detection unit 114 detects that the object (eye) has separated by a predetermined distance or more, the display of items or the like in the in-finder display unit 113 are erased. Also, when the user looks into the viewfinder 112, the display of the backside display unit 101 is erased, but a touch operation on the touch panel 270a can be accepted. By performing a touch operation on the touch panel 270a using a thumb or the like in a state in which the grip portion 115 is held by a hand and a forefinger is placed on the shutter-release button 102, the user can quickly move the AF frame indicating the position regarding which AF (autofocus) processing is performed, and give a shooting instruction, while looking at the display of the in-finder display unit 113 (and a subject seen through the OVF). Note that the display of the viewfinder 112 may not be made by the OVF, and may be made by an EVP (electrical viewfinder). When the in-finder display unit 113 is an EVF, a live view image captured by an image capturing unit 222 is displayed in the in-finder display unit 113, and the user can visually recognize the subject by looking into the viewfinder 112. The backside display unit 101 similarly functions as the EVF for displaying a live view image. Also, when the in-finder display unit 113 is an EVF, information relating to shooting, the AF frame, and the like can be displayed in the in-tinder display unit 113 along with a live view image.

A lens unit 200 constitutes an optical system that is detachable from the digital camera 100.

Next, the internal configuration of the digital camera 100 and lens unit 200 according to the present embodiment will be described with reference to FIG. 2. In FIG. 2, configurations that are the same as in FIGS. 1A and 1B are denoted by the same reference signs.

Figure 2:
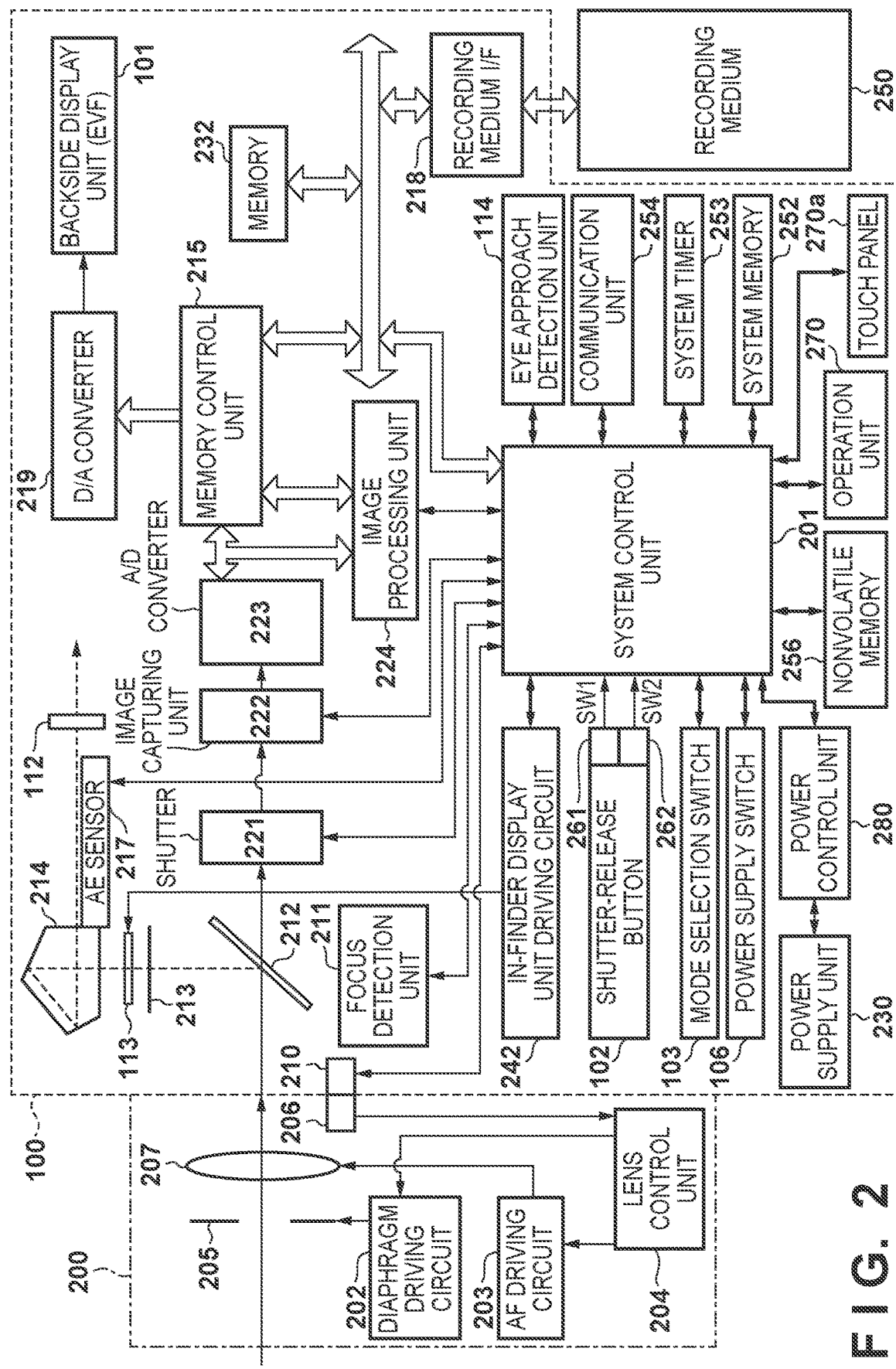
FIG. 2 is a block diagram showing an apparatus configuration of the present embodiment.

In FIG. 2, the lens unit 200 is equipped with a shooting lens 207, and is detachable from the digital camera 100. The shooting lens 207 is usually constituted by a plurality of lenses, but is simplified here and is shown by one lens only. A communication terminal 206 is an electric contact for the lens unit 200 to perform communication with the digital camera 100. The communication terminal 210 is an electric contact for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

An AF, sensor 217 performs photometry to obtain the luminance of the object taken in through the lens unit 200. A focus detection unit 211 outputs a defocus amount to the system control unit 201, and the system control unit 201 communicates with the lens unit 200 in accordance with the defocus amount, and performs a control for automatic focus processing using a phase difference detection method. Note that the AF control is not limited to the phase difference detection method and may be a contrast AF method.

A quick return mirror 212 receives an instruction from the system control unit 201 at the time of exposure, live view display, and moving image shooting, and is driven to the upward position or the downward position by the actuator (not illustrated). The quick return mirror 212 switches luminous flux entering the shooting lens 207 to the finder 112 or an image capturing unit 222. The quick return mirror 212 is usually biased toward the downward position so as to reflect the luminous flux and guide the luminous flux to the finder 112, but for exposure and live view display, jumps upward and recedes from the luminous flux (to the upward position) so as to guide the luminous flux to the image capturing unit 222. In addition, the central portion of the quick return mirror 212 is a half mirror such that a portion of the luminous flux passes through and enters the focus detection unit 211. The photographer can check, via a pentagonal prism 214 and the finder 112, the focus and composition of the object image taken in through the lens unit 200 by observing the focusing screen 213.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. An A/D converter 223 converts analog signals output from the image capturing unit 222 into digital signals and generates image data.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

Digital data output from the A/D converter 223 is directly written into a memory 232 via both the image processing unit 224 and the memory control unit 215 or via the memory control unit 215. The memory 232 stores the image data obtained from the image capturing unit 222 and the A/D converter 223, and image display data to be displayed on the backside display unit 101. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into an analog signal and supplies the backside display unit 101 with the analog signal. The image display data that was written into the memory 232 is displayed by the backside display unit 101 via the D/A converter 219. The backside display unit 101 performs display in accordance with the analog signal from the D/A converter 219. In this manner, the digital signals stored in the memory 232 are converted into analog signals, and the analog signals are successively transmitted to the backside display unit 101 so as to be displayed thereon, making it possible to realize an electronic view finder (EVF) functionality and to perform live view display (through image display).

A frame that indicates a ranging point (AF position) at which AF processing is currently performed, an icon that indicates the setting state of the camera, and the like are displayed on an in-tinder display unit 113 via an in-finder display unit driving circuit 242. Accordingly, the user can check the AF position and camera setting state through an optical viewfinder (OVF) that enables an object image picked up by the lens unit 200 to be viewed by looking through the viewfinder 112.

An eye approach detection unit 114 is arranged near the eyepiece part 112*a*, and can detect approach of any object to the eyepiece part 112*a*. As the eye approach detection unit 114, for example, an infrared proximity sensor is used.

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various flowcharts that will be described later.

The system control unit 201 has a CPU (Central Processing Unit or a MPU (Micro Processing Unit) for overall controlling the entire digital camera 100, and realizes, by executing the programs stored in the nonvolatile memory 256, the procedures of the flowchart that will be described later. The system memory 252 is, for example, a RAM and used also as a work memory where constants and variables for operating the system control unit 201, and the programs read out from the nonvolatile memory 256 are expanded. The system control unit 201 controls the memory 232, the D/A converter 219, the backside display unit 101, the in-finder display unit 113, and the like, so as to perform display control. A system timer 253 is a time measurement unit for measuring time periods for various types of controls and the time of an integrated clock.

A mode selection switch 103, a first shutter switch 261, a second shutter switch 262, and the operation units 270 are operation devices for inputting various types of instructions into the system control unit 201. The mode selection switch 103 switches the operation mode of the system control unit 201 to any of a still image shooting mode, a moving image recording mode, and a reproduction mode. The still image shooting mode includes an automatic shooting mode, an automatic scene determination mode, a manual mode, aperture-priority AE mode (Av mode), shutter-priority AE mode (Tv mode), and program AE mode (P mode), for example. The still image shooting mode also includes various scene mode each of which scene-specific shooting setting is made, custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, also the moving image recording mode and the reproduction mode may include a plurality of modes.

While the shutter-release button 102 provided on the digital camera 100 is being operated, that is, pressed halfway (the shooting preparation instruction), the first shutter switch 261 is turned on and generates a first shutter switch signal SW1. Upon receiving the first shutter switch signal SW1, the system control unit 201 causes the image processing unit 224 to start the AF processing, the AE processing, the AWB processing, the EF processing and the like.

When the operation of the shutter-release button 102 is completed, that is, the shutter-release button 102 is pressed fully (the shooting instruction), the second shutter switch 262 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

By selecting items for setting various functions or items representing setting values displayed on the backside display unit 101, appropriate functions for each situation are assigned to the operation units 270, and the operation units 270 thus act as various function buttons. Examples of these function buttons include a menu button, an end button, a back button, an image scrolling button, a jump button, a narrow-down button, and an attribute change button. For example, a menu screen that enables various settings to be made is displayed on the backside display unit 101 by pressing the menu button. The user can make various settings intuitively by using the menu screen, which is displayed on the backside display unit 101, the cross key 108 and the SET button 109.

The operation unit 270 is an input device that accepts an operation made by the user and notifies the system control unit 201 of the operation, and includes at least the following operation members. The operation members are the shutter-release button 102, the main electronic dial 105, the power supply switch 106, the sub electronic dial 107, the cross key 108, the SET button 109, the LV button 110, and the reproduction button 111. The cross key 108 is a directional button in which upper, lower, right and left portions of the cross key 108 can be pushed down. Although the description is given as an integrated operation unit in the present embodiment, an up button, a down button, a right button, and a left button may be independent buttons. Hereinafter, the upper and lower portions are referred to as an up and down key, and the left and right portions are referred to as a left and right key.

A power control unit 280 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as a NiCd battery, a NAM battery, or a Li-ion battery, or an AC adaptor. A recording medium I/F 218 is for interfacing with the recording medium 250 such as a memory card or a hard disk drive. The recording medium 250 is a recording medium such as a memory card for recording shot images, and constituted by a semiconductor memory, a magnetic disk, or the like.

A communication unit 254 is connected by a wireless antenna or a cable, and transmits and receives a video signal, an audio signal, and the like. The communication unit 254 can also connect to a wireless LAN (Local Area Network) and the Internet. The communication unit 254 can transmit image data (including a live view image) captured by the image capturing unit 222 and an image tile recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or Wireless USB, or a wired connection device such as a USB cable, HDMI®, IEEE 1394, or the like.

Included among the operation units 270 is also the touch panel 270a that is capable of detecting a touch operation on the backside display unit 101. The touch panel 270a and the backside display unit 101 can be constructed as a single integrated unit. For example, the touch panel 270a is constructed in such a manner that the transmittance of light will not interfere with the display presented by the backside display unit 101, and it is attached to the uppermost layer of the display face of the backside display unit 101. In addition, input coordinates on the touch panel 270a and display coordinates on the backside display unit 101 are correlated. As a result, a GUI can be constructed that makes it possible for the user to directly manipulate the screen displayed on the backside display unit 101. In this manner, a setting for accepting an instruction by associating a position where the touch operation is performed with the position of the backside display unit 101 is referred to as an absolute coordinate setting.

Also, unlike the absolute coordinate setting, a setting for accepting an instruction to move to a position from a predetermined position on the backside display unit 101 according to the movement amount of the touch operation, the movement direction, etc., instead of the touch position coordinates (the position moved by the movement operation), is referred to as a relative coordinate setting.

When the user performs the touch operation while looking through the in-finder display unit 113, if the touch operation is performed in the absolute coordinate setting, since the user performs the touch operation without looking at the touch panel 270a (the backside display unit 101), there is a high possibility that the user will perform wrong touch operations to a position deviated from a desired position. On the other hand, if the touch operation is performed in the relative coordinate setting, since a movement instruction is given not by a touch operation position but by a movement amount of the touch operation. Therefore, if the user performs the operation for moving the operation target to the desired position while observing the position of the operation target displayed on the in-finder display unit 113, it is possible to give the instruction for moving the operation target to the desired position. Note that a function in which the touch panel 270a accepts a touch operation while displaying an image on the backside display unit 101 is referred to as a touch pad function.

The system control unit 201 is capable of detecting the following touch operations and conditions performed by contacting the touch panel 270a.

Newly touching of the touch panel 270a by a finger or pen which has not been in contact with the touch panel 270a, that is a start of the touch (referred to as "touch-down" below).

A state in which the touch panel 270a is in contact with a finger or pen (referred to as "touch-on" below).

Movement of a finger or pen while in contact with the touch panel 270a (referred to as "touch-move" below).

Lifting of a finger or pen that has been in contact with the touch panel 270a, that is an end of the touch (referred to as "touch-up" below).

A state in which the touch panel 270a is not being touched at all (referred to as "touch-off" below).

Performing the touch-down on the touch panel 270a and the touch-up within a predetermined time without performing the touch-move (referred to as "tap" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 270a is being touched by the finger or pen are communicated to the system control unit 201 through an internal bus and, based upon the information thus communicated, the system control unit 201 determines what kind of operation (touch operation) was performed on the touch panel 270a.

As for "touch-move", the determination can be made also for every vertical component and horizontal component with regard to the direction of movement of the finger or pen, which is moved on the touch panel 270a, based upon a change in the coordinate position. Further, the system control unit 201 can determine that a slide operation (drag) has been performed if it detects a touch-move over a predetermined distance. An operation in which a finger is touched against the touch panel 270a, swiftly moved a certain distance, and then lifted away will be referred to as a "flick". In other words, a flick is an operation in which a finger is swiftly flicked across the touch panel 270a. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 270a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The eye approach detection unit 114 detects whether an eye (an object) has approached (eye approaching) or has moved away from (eye detached) the eyepiece part 112a (approach detection). The system control unit 201 switches the backside display unit 101, which is an EVF, and the in-finder display unit 113 between displaying (a display state)/not displaying (a non-display state) in accordance with the state detected by the eye approach detection unit 114. The system control unit 201 sets a display destination as the backside display unit 101 and sets the in-finder display unit 113 to be not displaying during non-eye approach detection at least in a case where the shooting mode and the switching of the display destination are automatic. Further, the system control unit 201 sets the display destination as the in-finder display unit 113 and sets the backside display unit 101 to be not displaying during eye approach detection.

If an object has approached, infrared light irradiated from a light emitting unit (not illustrated) of the eye approach detection unit 114 is reflected and incident on a light receiving unit (not illustrated) of the infrared proximity sensor. In accordance with an incident light amount of the infrared light received by the infrared proximity sensor, it is possible to detect an approach of some kind of physical object to the eyepiece part 112a, and discriminate to what level of distance the object has gotten close to the eyepiece part 112a (an eye approaching distance). Upon detecting an approach of an object to the eyepiece part 112a, the system control unit 201 can cause display of the in-finder display unit 113 to start. With this, it is possible for the in-finder display unit 113 to display without delay as much as possible when a user looks through the eyepiece part 112a.

In addition, upon detecting that an object has approached within a predetermined distance with respect to the eyepiece part 112a from eye non-approaching state (no approach state), the eye approach detection unit 114 determines that an eye approaching is detected and transmits an eye approach detection notification to the system control unit 201. In addition, if an object for which an approach was detected is apart by the predetermined distance or more from an eye approaching state (approach state), the eye approach detection unit 114 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is an eye non-approaching state until eye approaching is detected. With this, the system control unit 201 performs display control of the backside display unit 101 and the in-finder display unit 113 in response to an eye approaching state or an eye separation state detected by the eye approach detection unit 114.

In a touch-and-drag AF setting that will be described later, an AF position designation method according to the touch operation during eye approach detection can be set to either an absolute position designation or a relative position designation. The initial value is the absolute position designation. In the case of the absolute position designation, the position coordinates on the operation surface of the touch panel 270*a* are uniquely associated with the AF possible area within a shooting range, and when the touch panel 270*a* is touched, the AF position is set to the position within the shooting range associated with the touched position. Therefore, for example, when the position of the lower right object in the LV image is to be the AF position, the user can set the AF position to the lower right by touching the lower right position of the touch panel 270*a*. On the other hand, in the case of the relative position designation, the position coordinates on the operation surface of the touch panel 270*a* and the AF possible area within the shooting range cannot be uniquely associated with each other. In the relative position designation, when the touch-move is performed on the touch panel 270*a*, regardless of the touch-down position, the touch position is moved in the moving direction of the touch-move from the currently set AF position by a distance corresponding to the moving amount of the touch-move.

Control Processing

Next, the control processing performed by the digital camera 100 of the present embodiment will be described with reference to FIGS. 3A to 8D.

Figure 3A:
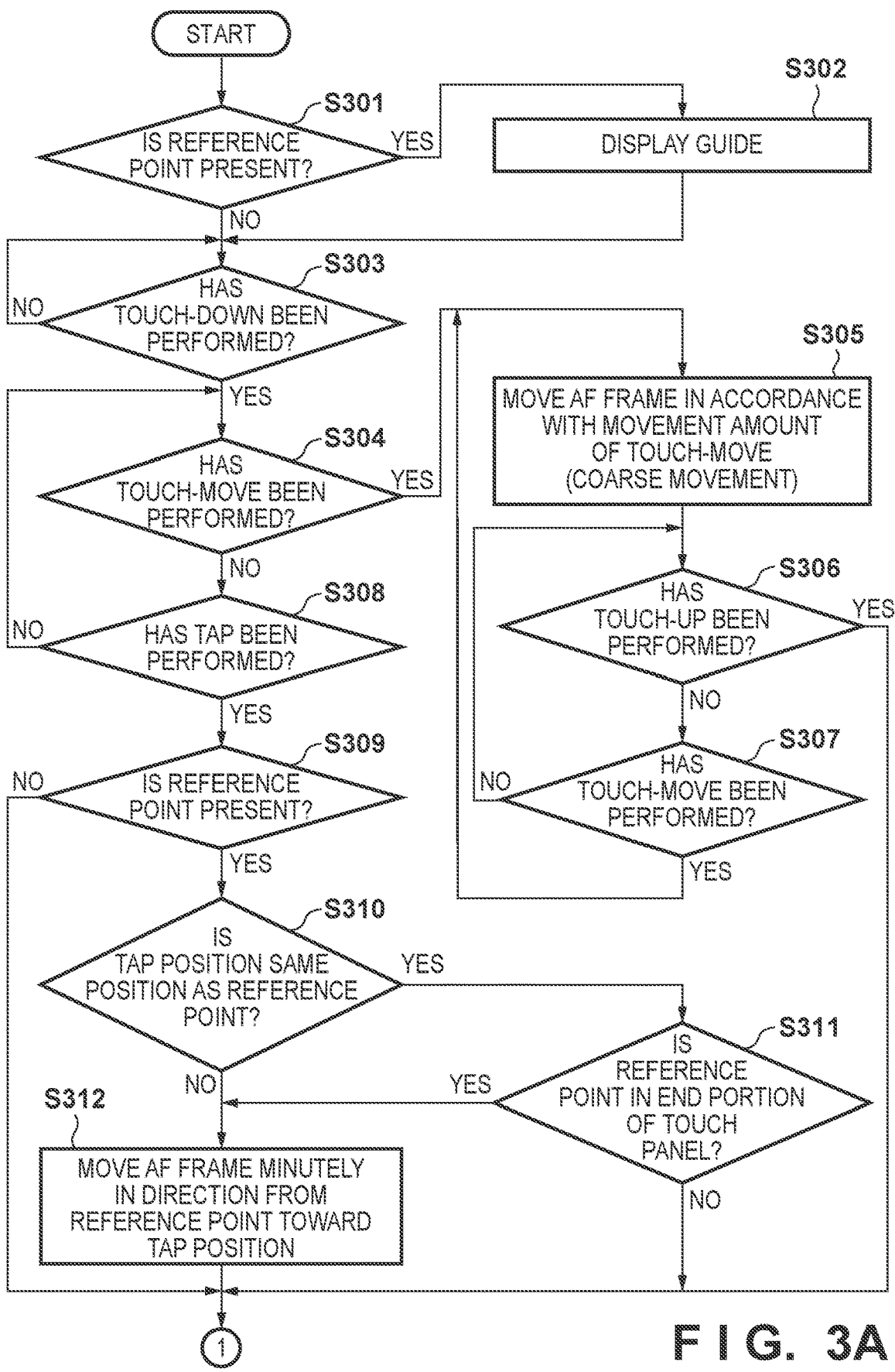
FIGS. 3A and 3B are flowcharts illustrating processing for moving an AF frame, of the present embodiment.
Figure 3B:
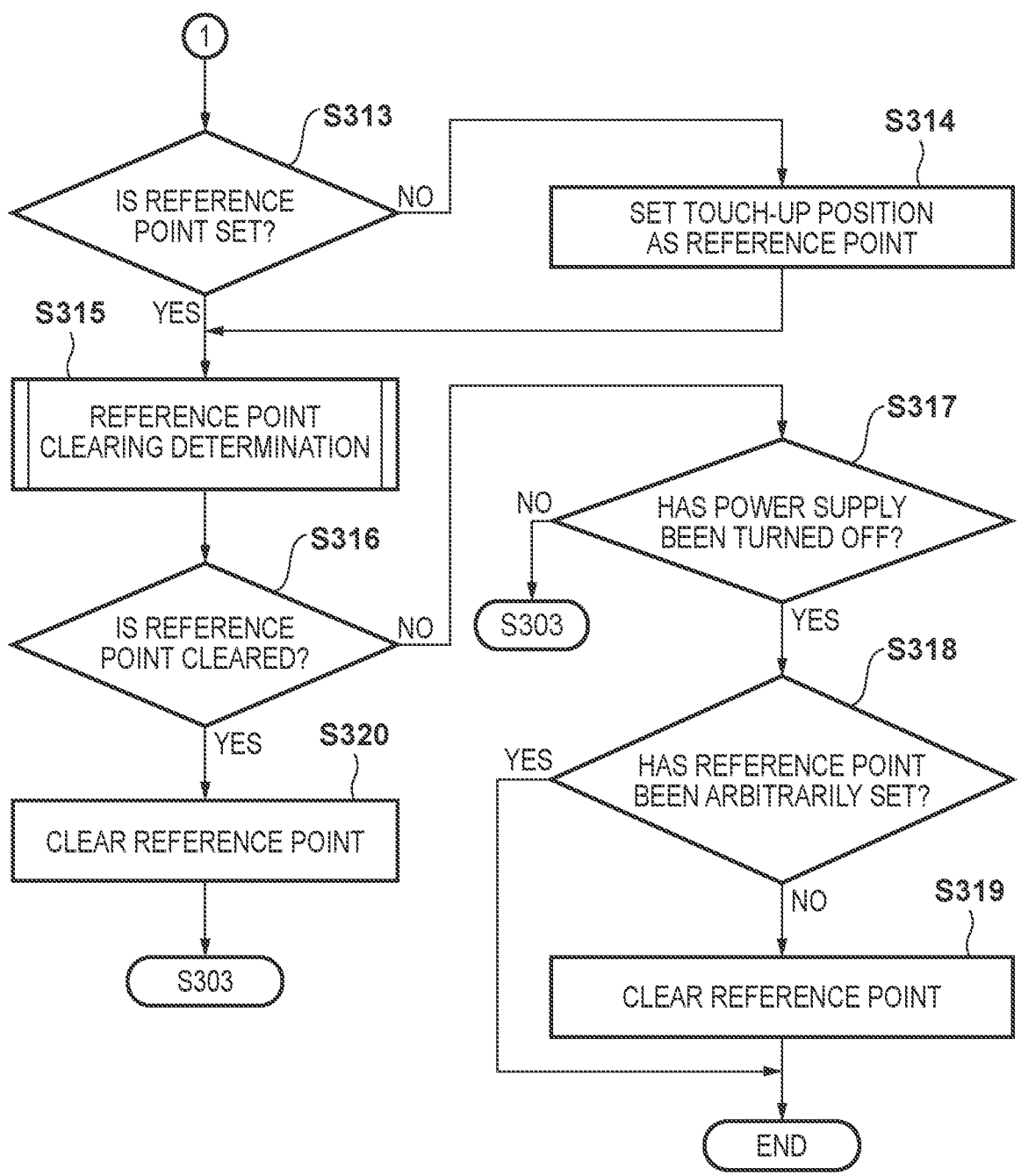
Figure 4:
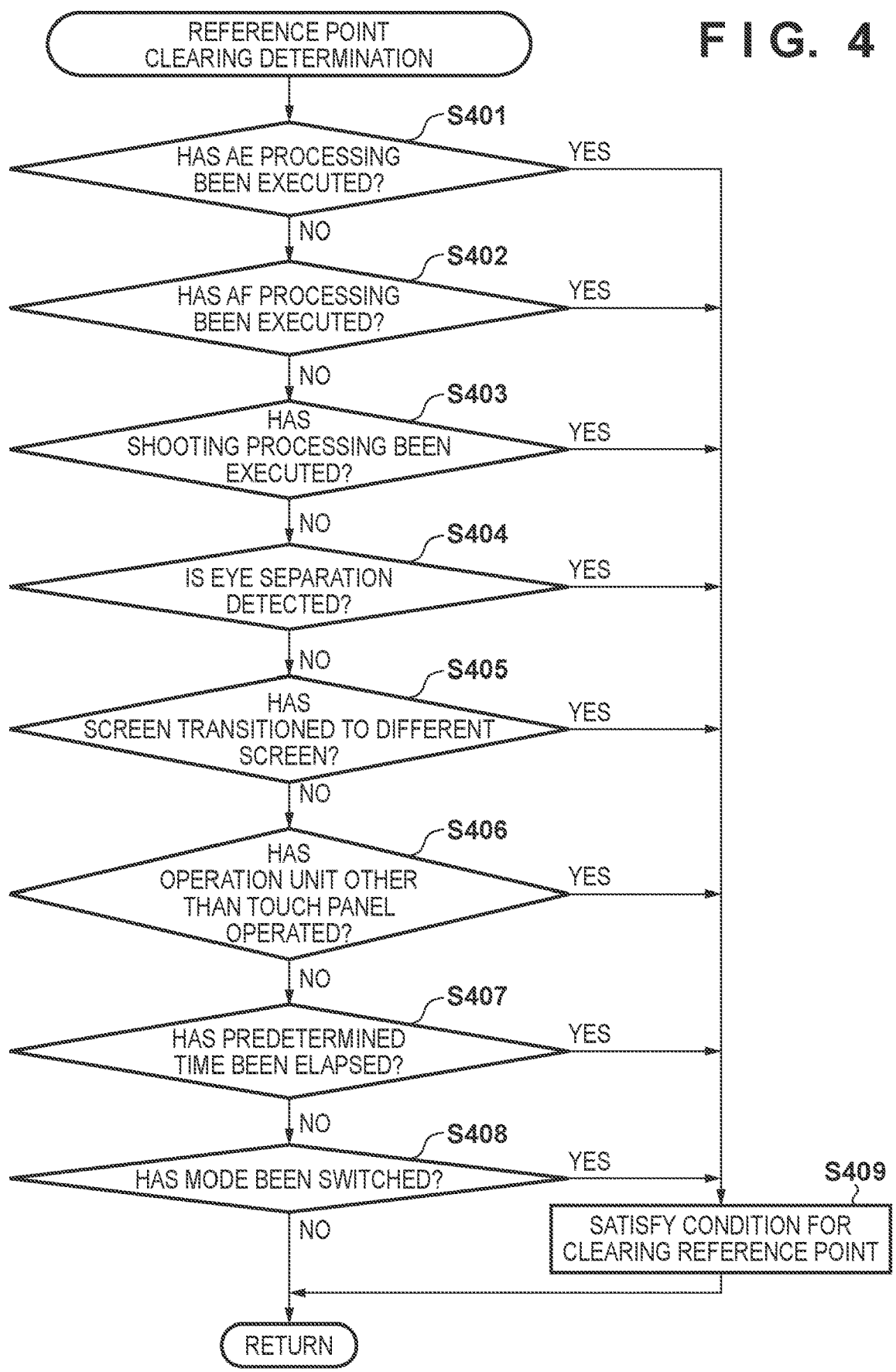
FIG. 4 is a flowchart illustrating processing for determining a condition for clearing a reference point, of the present embodiment.

Note that the procedures shown in FIGS. 3A, 3B and 4 are realized by deploying a program recorded in the nonvolatile memory 256 to a system memory 252, and the system control unit 201 executing the program.

FIGS. 3A and 3B are flowcharts illustrating processing for moving the AF frame, of the present embodiment. Note that the processing shown in FIGS. 3A and 3B is started when the power supply of the digital camera 100 is turned on, the display of the backside display unit 101 is turned on as an EVF, and the AF mode is set to the touch-and-drag AF.

In step S301, the system control unit 201 determines whether or not a reference point (e.g., reference position 512 in FIG. 5B, reference position 761 in FIG. 7D) is present, and if the reference point is present, advances the processing to step S302, and if the reference point is not present, advances the processing to step S303. Here, the reference point indicates a reference point that is set by the user using a menu screen that will be described later using FIG. 7A to 7D, or a reference point that is set by touch-move, which will be described later using FIGS. 3A and 3B.

In step S302, the system control unit 201 displays a guide for notifying that the reference point is present, and the AF frame (551 in FIG. 5C) can be moved by tapping the touch panel 270*a*. The details of the guide will be described later with reference to FIGS. 8A to 8D.

In step S303, the system control unit 201 determines whether or not the user has performed touch-down on the touch panel 270*a*, and if the touch-down has been performed, advances the processing to step S302, and if the touch-down has not been performed, returns the processing to step S301.

In step S304, the system control unit 201 determines whether or not the user has performed touch-move (513 in FIG. 5B) on the touch panel 270*a*, and if the touch-move has been performed, advances the processing to step S303, and if the touch-move has not been performed, advances the processing to step S306. Note that if, after it is determined that a tap is not performed in step S308, which will be described later, it is determined that the touch-move is also not performed in step S304, the system control unit 201 will not update the reference point nor move the AF frame, even if touch-up is detected.

In step S305, the system control unit 201 moves the AF frame that is displayed in the backside display unit 101 (503 in FIG. 5A) based on the movement amount of the touch-move in step S304, and advances the processing to step S306. Here, if the movement amount of the touch-move is $(X, Y)=(\alpha, \beta)$ and the movement amount is A on the touch panel 270*a*, the position of the AF frame in the EVP is $(x, y)=(P\alpha, P\beta)$ and the movement amount is $A \times P$. P is a predetermined value, and may be (EVF size)/(touch panel size), or larger or smaller than that. As the value of P increases, the movement amount of the AF frame increases relative to the movement amount of the touch made by the user, and as the value of P decreases, the movement amount of the AF frame decreases relative to the movement amount of the touch made by the user. If the value of P is too small, even if the touch-move is performed from one end portion to the other end portion of the touch panel, the AF frame cannot be moved from one end portion to the other end portion of the EVF, and it is possible that the touch-move must be performed many times. On the other hand, if the value of P is too large, the AF frame moves by a large amount relative to the movement amount of the touch position, although this is suitable for a case where the AF frame is desired to be moved by a large amount quickly, the AF frame is easily moved to an unintended position. Therefore, if the value of P is in the vicinity of the value (EVF size)/(touch panel size), the user can intuitively perform operation. In the present embodiment, P is a fixed value, but may be set by the user.

In step S306, the system control unit 201 determines whether or not the user has performed touch-up from the touch panel 270*a*, and if the touch-up has been performed, advances the processing to step S313, and if the touch-up has not been performed, advances the processing to step S307.

In step S307, the system control unit 201 determines whether or not the user has performed touch-move on the touch panel 270*a*, and if the touch-move has been performed, returns the processing to step S305, and if the touch-move has not been performed, returns the processing to step S306.

In step S308, the system control unit 201 determines whether or not the user has performed a tap on the touch panel 270*a*, and if the tap has been performed, advances the processing to step S309, and if the tap has not been performed, returns the processing to step S304.

In step S309, the system control unit 201 determines whether or not the reference point is present, and if the reference point is present, advances the processing to step S310, and if the reference point is not present, advances the processing to step S313.

In step S310, the system control unit 201 determines whether or not the tap position (561 in FIG. 5D) in step S308 is the same position as the reference point, and if the position is the same as the reference point, advances the processing to step S311, and if the position is not the same as the reference point, advances the processing to step S312. If the processing is advanced to step S309 after NO has been determined in step S304, because the touch-move is not performed in step S304, the system control unit 201 determines that a tap has been performed in step S309.

In step S311, the system control unit 201 determines whether or not the tap position (561 in FIG. 5D) in step S308 is in an end portion of the touch panel 270a, that is, whether or not the reference point is in an end portion of the touch panel 270a. The system control unit 201, if the reference point is in an end portion of the touch panel 270a, advances the processing to step S312, and if the reference point is not in an end portion of the touch panel 270a, advances the processing to step S313. Even if, in step S310, the touch-up position is the same as the reference point, if the reference point is positioned in an end portion of the touch panel 270a the touch operation cannot be performed at all in a direction from the reference point toward the end portion, and therefore, as a result of tapping the reference point, the AF frame is moved from the reference point toward the tap position by a predetermined amount, in step S312. On the other hand, if the reference point is not in an end portion of the touch panel 270a, even if the touch-up position is the same as the reference point, the AF frame is not moved. That is, when the reference point is not at a right end of the touch panel 270a, and is not at upper/lower ends thereof, when the reference point is tapped, the AF frame is moved rightward from the current position of the AF frame by a predetermined amount. When a point on an upper side (lower side) of the reference point and at a right end (right side) of the touch panel 270a is tapped, the AF frame is moved upward (downward) by the predetermined amount.

In step S312, the system control unit 201 moves the AF frame displayed in the EVF in a direction toward the end portion of the touch panel 270a by the predetermined amount, and advances the processing to step S313. In step S312, the system control unit 201 compares the position of the reference point with the tap position in step S308, and finely moves (hereinafter, minutely moves) the AF frame by the predetermined amount rightward if the tap position is on the right side of the reference point, leftward if the tap position is on the left side, upward if the tap position is on the upper side, and downward if the tap position is on the lower side. The predetermined amount by which the AF frame is minutely moved is sufficiently smaller than the amount of coarse movement in step S305. For example, the predetermined amount is set to a unit of 1 pixel or 3 pixels in the display screen of the EVF. It is difficult for the user to move the touch position by a minute distance that is less than one third or half the width of the finger that touches the touch panel 270a, or it takes time. Moreover, the position at which the finger touches may minutely shift when touch-up is performed, and therefore, even if a fine adjustment can be made by the touch-move, a further shift may occur when the touch-up is performed. Therefore, in the present embodiment, as a result of making it possible to move by a minute amount by the tap operation, which is difficult by the touch-move, fine adjustment of the AF position can be accurately performed. For example, assume that the AF frame moves on the display unit by 10 pixels when the touch position is moved by 1 cm. In this case, in order to move the AF frame by an amount such as 1 pixel or 2 pixels, the touch position needs to be moved by an amount such as 1 mm or 2 mm. Therefore, if the predetermined amount by which movement is performed in response to the tap operation is set to 1 pixel or 2 pixels, the user can easily realize a minute movement of the AF frame by performing the tap operation. Note that, during the tap operation, even if the touch position is slightly moved when the touch is released, the AF frame is not caused to move by this touch movement. The relationship between the reference point and the tap position will be described later with reference to FIG. 6. Also, the details of the processing in step S312 will be described later with reference to FIGS. 5A to 5D.

In step S313, the system control unit 201 determines whether or not the reference point is set, and if the reference point is set, advances the processing to step S315, and if the reference point is not set, advances the processing to step S314.

In step S314, the system control unit 201 sets the touch-up position (561 in FIG. 5D) in step S306 as a new reference point, stores the new reference point in the system memory 252, and advances the processing to step S315.

In step S315, the system control unit 201 determines the condition for clearing the reference point. The details of this processing will described with reference to FIG. 4.

In step S316, the system control unit 201 determines whether or not the reference point is cleared, and if the reference point is cleared, advances the processing to step S320, cancels the reference point, and thereafter returns the processing to step S303. Also, if the reference point is not cleared, the system control unit 201 advances the processing to step S317.

In step S317, the system control unit 201 determines whether or not the user has turned off the power supply of the digital camera 100, and if the power supply is turned off, advances the processing to step S318, and if the power supply is not turned off, returns the processing to step S303.

In step S318, the system control unit 201 determines whether or not the reference point at the point in time when the power supply is turned off has been arbitrarily set by the user operation (that is not set on the menu screen, but is set in step S314), and if the reference point has not been arbitrarily set, advances the processing to step S319, cancels the reference point, and ends the processing. Also, if the reference point has been arbitrarily set, the system control unit 201 ends the processing without canceling the reference point.

In step S320, the system control unit 201 cancels the reference point set in step S314, and returns the processing to step S303.

Note that the configuration may be such that, in step S318, if the reference point that has been arbitrarily set is separated from the touch-up position after the touch-move by the distance corresponding to one third of the length of the touch panel 270a, for example, the touch-up position after the touch-move operation is temporarily set as the reference point. When the user has released the touch at a position separated from the reference point set on the menu screen, the user needs to re-grip the digital camera 100 in order to tap at a position in the vicinity of the reference point. Therefore, as a result of temporarily changing the reference point to the touch-up position, the user can quickly finely adjust the AF frame position without re-gripping the camera. That is, when the user firmly holds the grip portion 115 with his/her right hand, and performs the touch operation with the right hand, it is easier for the user to perform operation by setting the reference point on the right side of the touch panel 270a, and therefore it is easier for the user to perform operation by setting the reference point at any position on the right side on the menu screen. Note that it is difficult for the user to touch at a position in the vicinity of the reference point in a state in which the user has slightly moved the right hand from the grip portion 115 in order to move the finger toward the left side of the touch panel 270a by performing touch-move, and therefore the user can perform fine adjustment without re-holding the grip portion 115.

Next, the processing for determining the condition for clearing the reference point in step S315 in FIG. 3B will be described with reference to FIG. 4. FIG. 4 is a flowchart illustrating the processing for determining the condition for clearing the reference point.

In step S401, the system control unit 201 determines whether or not the AE processing has been executed by the user having pressed the shutter-release button 102 half-way, and if the AE processing has been executed, advances the processing to step S409, and if the AE processing has not been executed, advances the processing to step S402.

In step S402, the system control unit 201 determines whether or not the AF processing has been executed by the user having pressed the shutter-release button 102 half-way, and if the AF processing has been executed, advances the processing to step S409, and if the AF processing has not been executed, advances the processing to step S403.

In step S403, the system control unit 201 determines whether or not the shooting processing has been executed by the user having pressed the shutter-release button 102 fully, and if the shooting processing has been executed, advances the processing to step S409, and if the shooting processing has not been executed, advances the processing to step S404.

In step S404, the system control unit 201 determines whether the eye approached state is achieved or the eye separated state is achieved regarding the eyepiece part 112a based on the detection result of the eye approach detection unit 114, and if it is determined to be the eye separated state, advances the processing to step S409, and if it is determined to be the eye approached state, advances the processing to step S405.

In step S405, the system control unit 201 determines whether or not the screen has transitioned from the live view screen to a different screen such as the menu screen, and if it is determined that the screen has transitioned to a different screen, advances the processing to step S409, and if it is determined that the screen has not transitioned to a different screen, advances the processing to step S406. The different screen is a menu screen 700 shown in FIG. 7A, for example.

In step S406, the system control unit 201 determines whether or not the user has operated the operation units 270 other than the touch panel 270a, and if it is determined that the user has operated another operation unit 270, advances the processing to step S409, and if it is determined that the user has not operated the other operation units 270, advances the processing to step S407. Note that, in step S406, touch operations such as a double tap may be included.

In step S407, the system control unit 201 determines whether or not a predetermined time has elapsed since touch-up was detected in step S306, and if it is determined that the predetermined time has elapsed, advances the processing to step S409, and if it is determined that the predetermined time has not elapsed, advances the processing to step S408. The predetermined time is a time period of 5 seconds or 7 seconds, for example. It is highly possible that, if the user has performed a next touch operation after elapsing some period of time after the user moved the AF frame position by performing a touch-move or tap operation, the user tries to move the AF frame to a subject that is different from the subject that was the target of the AF frame movement operation immediately before, and therefore the system control unit 201 determines that the condition for clearing the reference point is satisfied in step S409, and clears the reference point in step S320.

In step S408, the system control unit 201 determines whether or not the shooting mode has been switched from the touch-and-drag AF to another mode, and if the shooting mode has been switched to another mode, advances the processing to step S409, and if the shooting mode has not been switched to another mode, advances the processing to step S316. Note that the mode switching in step S408 also includes the switching of the AF mode from one point AF to continuous AF. Also, the switching from the shooting mode to the reproduction mode or the like is also included.

In step S409, the system control unit 201 determines that the condition for clearing the reference point stored in the system memory 252 is satisfied, and ends the processing.

According to the processing described above, when the user has operated the shutter-release button 102 and has separated the eye from the viewfinder 112, in the touch-and-drag AF setting, when the user has canceled the live view and displays another screen, when the user has operated an operation unit other than the touch panel, when a certain time has elapsed, and when the user has changed the mode, the setting of the reference point is canceled, and a new reference point is set.

Next, the operations of moving the AF frame by a touch operation will be described with reference to FIGS. 5A to 5D.

Figure 5B:
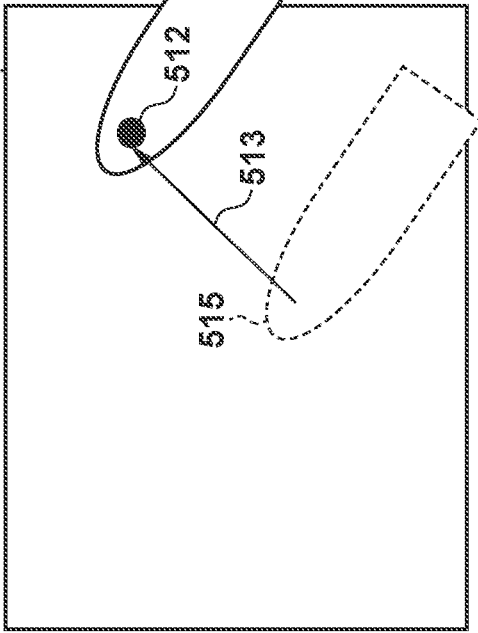
FIGS. 5A-5D are diagrams illustrating operations for moving the AF frame by a touch operation, of the present embodiment.
Figure 5D:
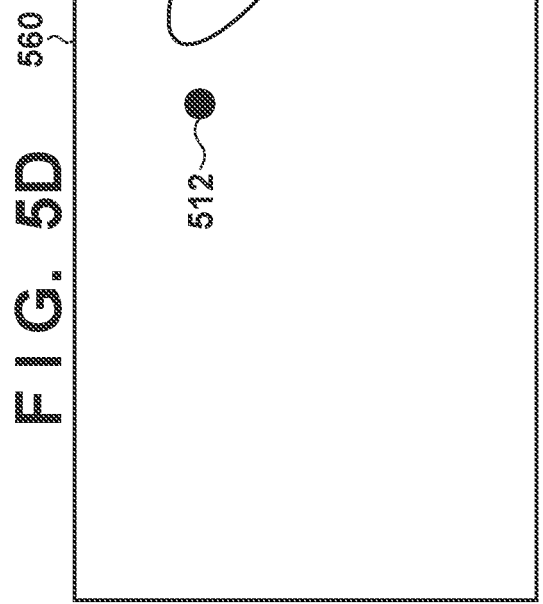
Figure 5A:
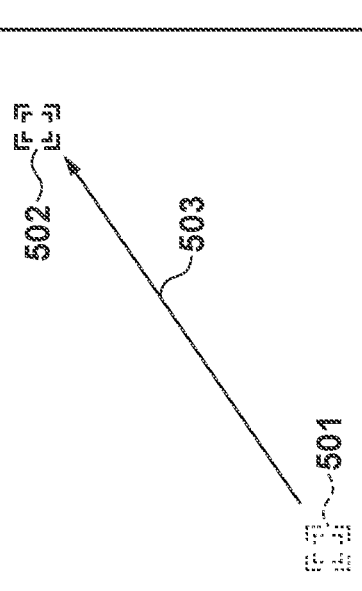
Figure 5C:

FIGS. 5A and 5C illustrate the manner of the AF frame moving on the display surface of the backside display unit 101. FIGS. 5B and 5D illustrate the touch operation performed on the touch panel 270a in order to move the AF frame as shown in FIGS. 5A and 5C.

FIGS. 5A and 5B shows a display surface 500 of the backside display unit 101 and an operation surface 510 of the touch panel 270a when coarsely moving the AF frame relatively by the touch-move. Also, FIGS. 5C and 5D shows a display surface 550 of the backside display unit 101 and an operation surface 560 of the touch panel 270a when minutely moving the AF frame by the tap.

First, the case of coarsely moving the AF frame will be described.

As shown in FIGS. 5A and 5B, when the user performs touch-move on the operation surface 510 of the touch panel 270a, and moves the finger from a touch position 515 to a touch position 516, as shown by a trace 513, the AF frame 501 of the backside display unit 101 moves to a position 502 on the display surface 500 while rendering the trace 503. In this case, when the user desires to move the AF frame from one end portion of the display surface 500 to the other end portion thereof, the user needs only to slightly move the touch position on the touch panel 270a, making the operation easy. Thereafter, as a result of performing touch-up, a central position 512 of the finger with which the touch-up was performed is set as the reference point, and the position information of the reference point is stored in the system memory 252.

Nest, the case of minutely moving the AF frame will be described.

As shown in FIGS. 5C and 5D, when the user performed a tap at a touch position 561 on the operation surface 560 of the touch panel 270a, the AF frame 551 minutely moves rightward. Because the tap position 561 is on the right side of the reference point 512, the AF frame 551 moves rightward by a predetermined amount. The predetermined amount is a fixed value regardless of the separation distance between the reference point 512 and the tap position 561.

In this way, in the present embodiment, both of the operation of coarsely moving the AF frame and the operation of minutely moving the AF frame can be performed on the touch panel 270a. Therefore, the user can perform a coarse movement of the AF frame and a fine adjustment of the AF frame by a minute movement by merely performing a touch operation on the touch panel 270a without moving his/her hand toward another operation member.

Figure 6:
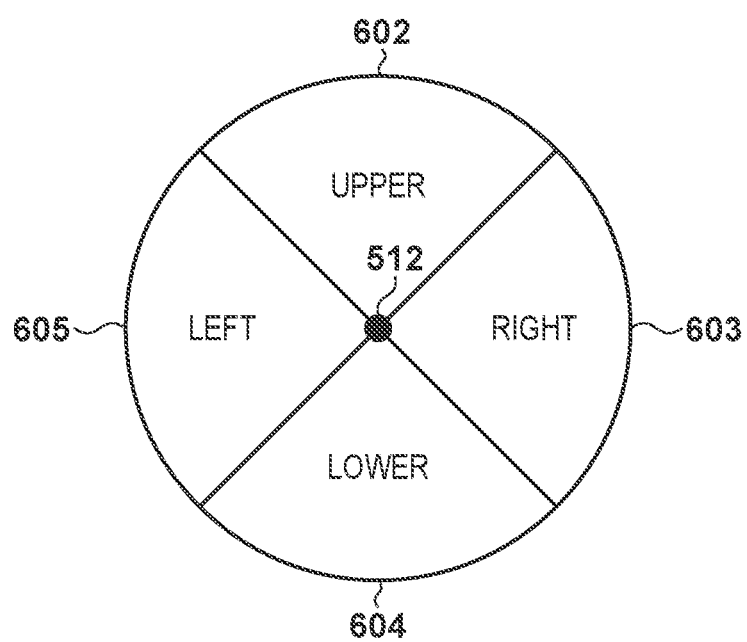
FIG. 6 is a diagram illustrating a relationship between a reference point and a tap position, of the present embodiment.
Figure 7C:
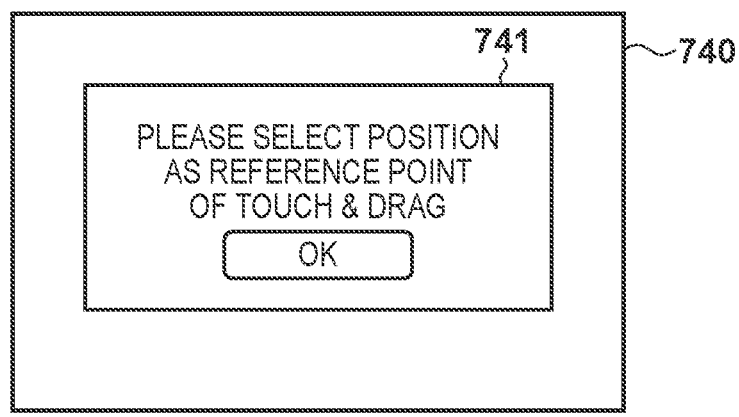
Figure 7D:
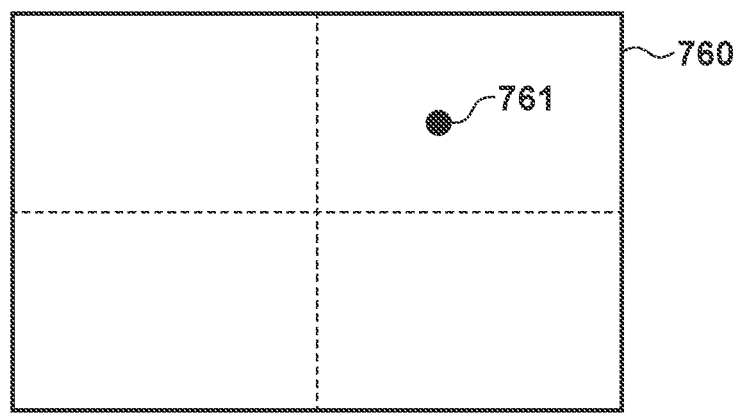

Next, the relationship between the reference point 512 and the tap position will be described with reference to FIG. 6.

In the present embodiment, upper/lower/left/right ranges 602 to 605 are defined with the reference point 512 being the center, and if the tap position is in the upper range 602, the AF frame minutely moves upward by a predetermined amount. If the tap position is in the right range 603, the AF frame minutely moves rightward by the predetermined amount. If the tap position is in the lower range 604, the AF frame minutely moves downward by the predetermined amount. If the tap position is in the left range 605, the AF frame minutely moves leftward by the predetermined amount. Also, every time the tap operation is performed, the AF frame minutely moves by the predetermined amount. In this way, if the tap position is in a certain range, even if the tap position is not immediately above or left/right, the AF frame can be minutely moved in a direction that is estimated to be intended by the user.

Next, the method of arbitrarily setting the reference point by a user operation will be describe with reference to FIGS. 7A to 7D.

FIGS. 7A and 7B illustrate the transition of the menu screen for setting the reference point by the user operation. In a main menu screen 700 in FIG. 7A, an AF tab 701 is selected, and therefore selection items 702 to 706 relating to AF are displayed as a list.

The selection item 702 is for the setting related to the touch-and-drag AF setting. The touch-and-drag AF is a function of moving the AF frame displayed in the backside display unit 101 to a desired position by performing a tap and touch-move on the touch panel 270a.

A touch-and-drag AF setting screen 720 is a setting screen that is displayed as a result of the selection item 702 having been selected. Selection items 721 to 724 are settings related to the touch-and-drag AF.

The selection item 724 is an item for the user to arbitrarily set the reference point. When the position designation method of the selection item 722 is set to "relative position", the reference point setting in the selection item 724 is enabled. The selection item 724 may be continuously displayed, or may be displayed only when the position designation method of the selection item 722 is "relative position".

When the selection item 724 for reference point setting is selected, a setting screen 740 is displayed. In a window 741, a guidance for describing the reference point setting method is displayed, and when an OK button in the window 741 is selected, a reference point setting screen 760 is displayed. The user can determine the position of the reference point with the reference point setting screen 760. The position range of the reference point is in the range selected by a touch area 723. In the touch-and-drag AF setting screen 720, "upper right" is selected as the touch area 723, and therefore the reference point can be set at a position 761, for example, in an upper right range on the reference point setting screen 760. When the reference point is to be set at another position, one of "lower right", "upper left", and "lower left" is selected in the touch area 723 as the position range of the reference point with the similar procedure, and the position of the reference point can be set in the selected range.

FIGS. 8A to 8D illustrates an exemplary display of the guide indicating that the reference point has been arbitrarily set. The guide has a function of notifying the user of a fact that the reference point has been arbitrarily set, and the AF frame can be minutely moved by tapping the screen.

Figure 8A:
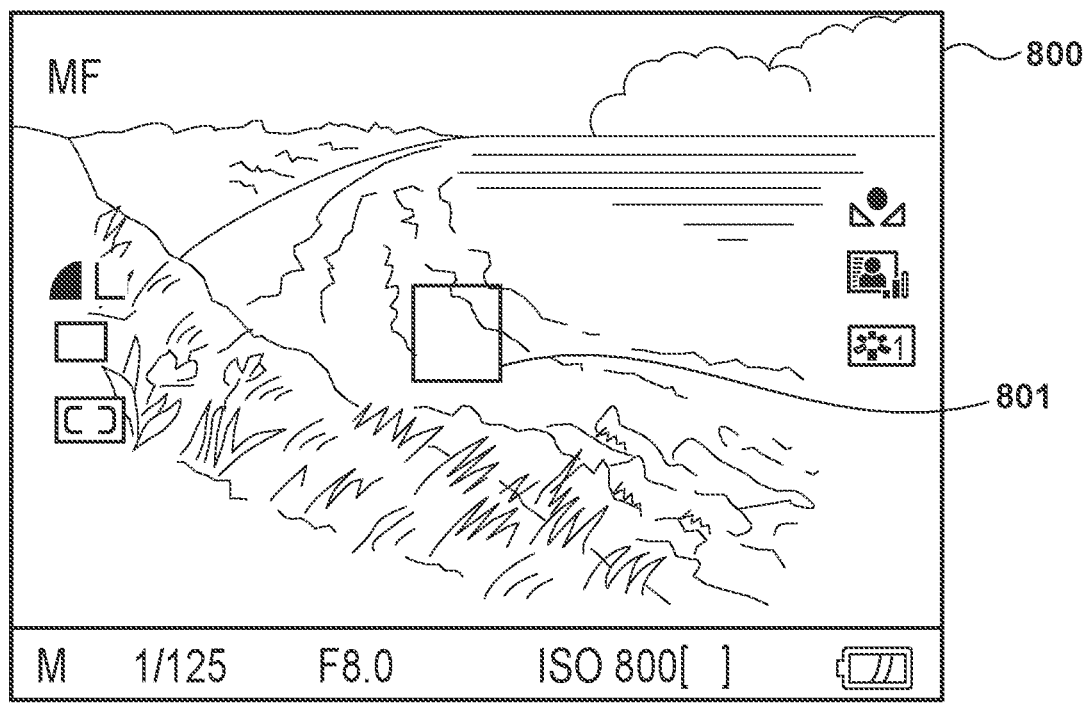
FIGS. 8A-8D are diagrams illustrating exemplary displays of live view screens, of the present embodiment.
Figure 8B:
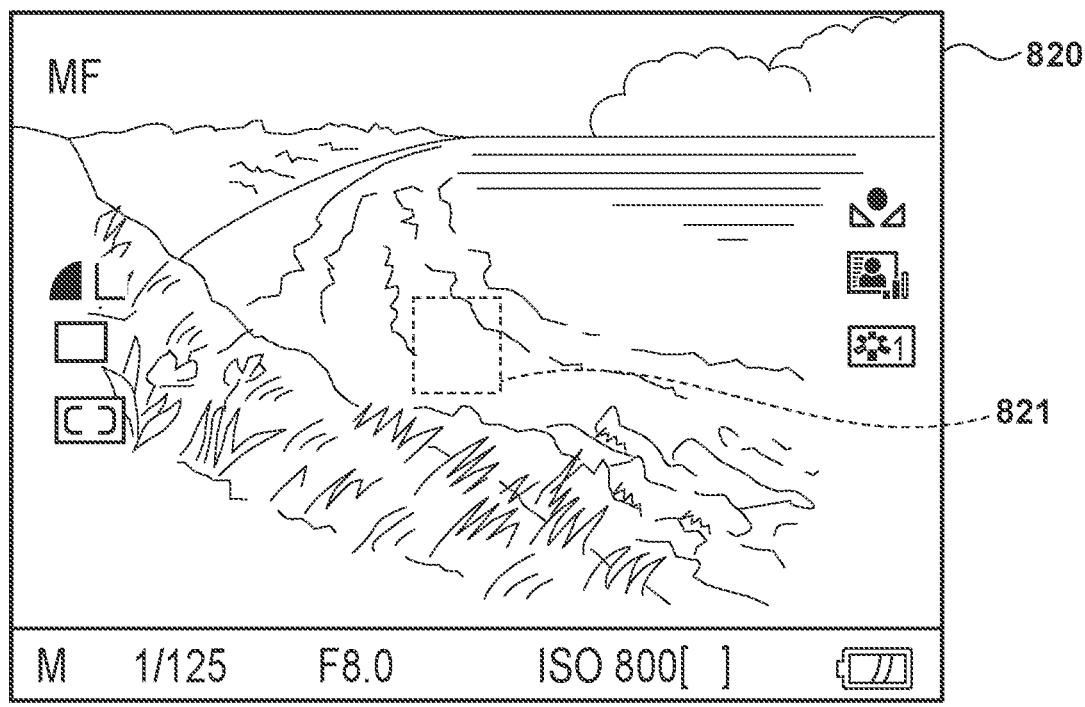
Figure 8C:
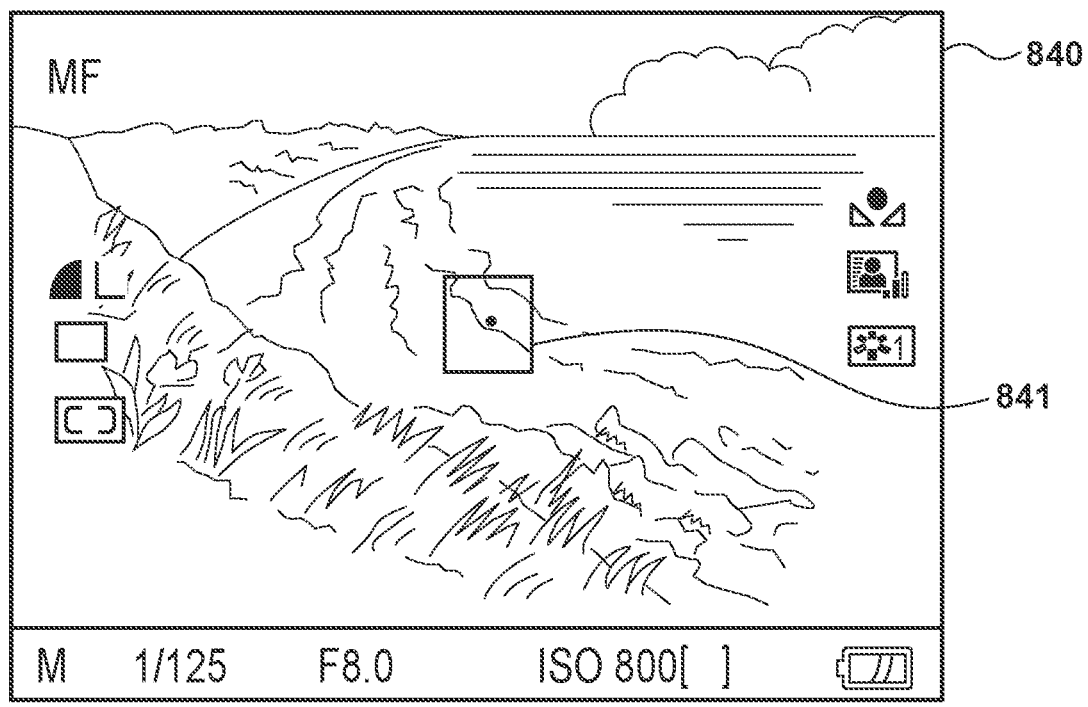
Figure 8D:
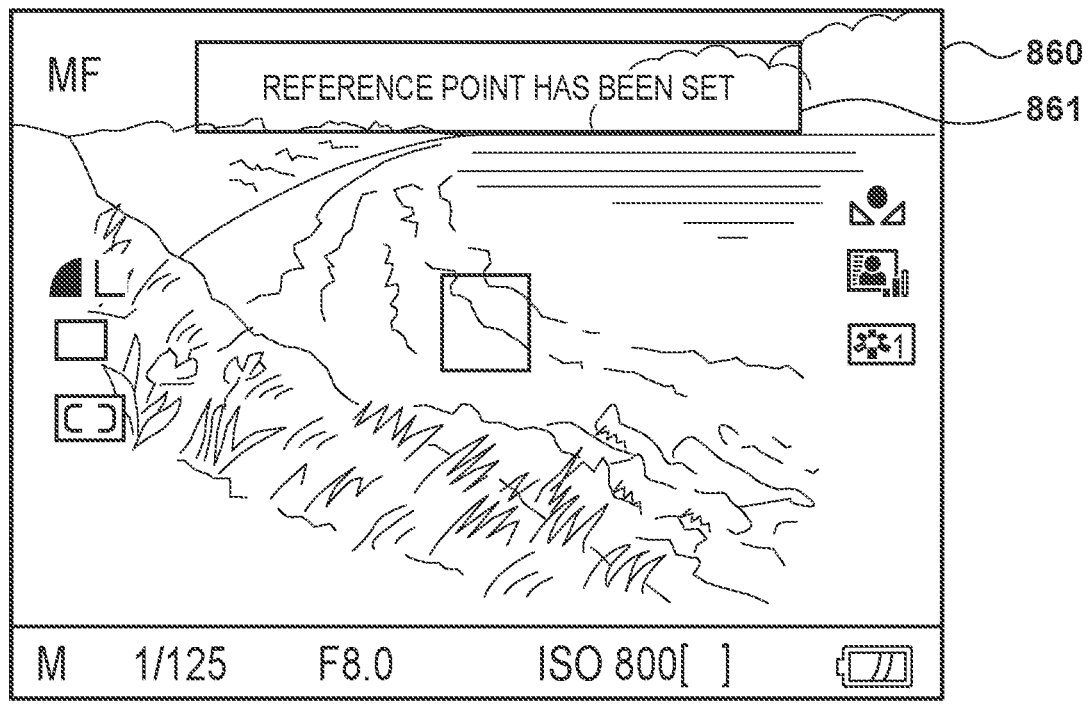

A guide 801 in FIG. 8A indicates that the reference point has not been arbitrarily set, and guides 821, 841, and 860 in FIGS. 8B to 8D indicate that the reference point has been arbitrarily set.

The guide 801 displays the AF frame with a solid line. The guide 821 displays the AF frame with a broken line. The guide 841 displays a dot at the center of the AF frame. The guide 861 displays characters separately from the AF frame. The guide may be displayed for a predetermined time in its display mode, may be returned to a normal AF frame or erased thereafter, or may be erased if some operation has been made. Also, the display modes of the guide in FIGS. 8A to 8D are not limited thereto.

Also, in the present embodiment, an example has been described in which the AF frame is minutely moved in the four directions of upper/lower/left/right, and is not moved in a direction other than upper/lower/left/right, but there is no limitation thereto, and the configuration may be such that the AF frame can be minutely moved in eight directions, ten directions, or the like.

As described above, according to the present embodiment, as a result of providing mechanism for coarsely moving the AF frame by touch-move performed on the touch panel 270a, and mechanism for minutely moving the AF frame by a tap, when the user desires to move the AF frame displayed in the EVF, the user can quickly move the AF frame to the desired position with a simple operation.

Note that the present embodiment can be applied to a method of changing a setting value, and to a method of changing the layer to be selected, in addition to a method of moving the display position of the AF frame and other items. In the case of the method of changing the layer to be selected, the layer is moved to upper layers by touch-move, and the items in the selected upper layer are moved upward/downward by a tap operation, for example. In the case of the method of changing a setting value, the configuration may be such that if a tap operation is performed on a right side of the reference point, the setting value is increased by one scale, and if a tap operation is performed on a left side of the reference point, the setting value is decreased by one scale, or the configuration may also be such that the setting value is changed by a half scale, which is finer.

Also, the present embodiment has been described taking the method of moving the AF frame as an example, but the present embodiment can be applied to other methods. For example, the present embodiment can be applied to a case where the position at which the color is to be changed or the area to be blurred is designated, when image editing is performed. Also, the present embodiment can also be applied to a case where processing regarding shooting is performed or an image is edited, based on the position of an item. For example, the present embodiment can also be applied to a case where the AE position is to be set.

Figure 9:
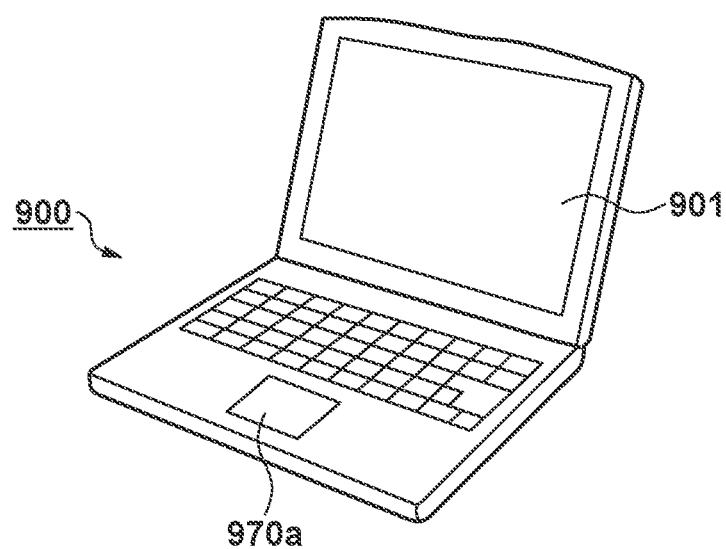
FIG. 9 is a diagram illustrating an application example to another apparatus, of the present embodiment.

Also, the present embodiment can also be applied to a notebook PC 900 shown in FIG. 9. In the notebook PC 900, a touch panel 970a and a display unit 901 are separately configured, and the touch panel 970a displays a cursor or the like at a position on a screen of the display unit 901 corresponding to the touch operation that the touch panel 970a has detected by functioning as a touch pad. Note that the processing in steps S401 to S404 in FIG. 4 is a processing specific to a digital camera, but the processing is steps S405 to S408 is processing to be executed by the notebook PC 900.

According to the present embodiment, the user can perform fine adjustment of the display position of an item using a touch panel with high operability.

Note that the foregoing various control described as something that the system control unit 201 performs may be performed by one piece of hardware, and a plurality of pieces of hardware may distribute processing to perform control of the entirety of the apparatus.

In addition, although the present invention was explained in detail based on suitable embodiments, the present invention is not limited to these specific embodiments, and various forms of a scope that does not deviate from the gist of this invention are included in the invention. Furthermore, the above-described embodiment is merely one embodiment of the present invention, and different embodiments can be combined as appropriate.

The present invention can be applied in PDAs, mobile telephone terminals and portable image viewers, printers having displays, digital photo frames, music players, game devices, e-book readers, and so on. In other words, the present invention can be applied to an apparatus having a display unit and a touch panel.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-223002, filed Dec. 10, 2019 which is hereby incorporated by reference herein in its entirety.

What is claimed is:

1. An electronic apparatus comprising:
    a touch detection unit configured to detect touch operations including a touch-down operation, a touch-move operation and a touch-up operation performed on a touch panel; and
    a display control unit configured to perform control to display an item on a screen of a display unit while moving the item from a reference position according to an amount of movement from the touch-down position based on the touch-down operation detected on the touch panel to the touch-move position based on the touch-move operation detected on the touch panel,
    wherein the reference position is updated with the touch-up position after the touch-move operation is detected and the touch-up operation is detected,
    wherein the item is moved from the reference position and displayed on the screen of the display unit even when no movement is made from the touch-down position to the touch-up position in a case where the touch-down operation and the touch-up operation are newly detected on the touch panel and the touch-up position based on the detected touch-up operation is in an end portion of the touch panel, and
    wherein the touch panel is separated from the display unit.

2. The apparatus according to claim 1, wherein
    the item is moved upward, downward, rightward or leftward from the reference position and displayed on the screen of the display unit when the touch-up position based on the detected touch-up operation is in an upper end, a lower end, a right end or a left end of the touch panel, even when no movement is made from the touch-down position to the touch-up position.

3. The apparatus according to claim 1, wherein the reference position is canceled, when an operation unit other than the touch panel has been operated.

4. The apparatus according to claim 1, wherein the reference position is canceled, when an operation for performing a shooting instruction is performed.

5. The apparatus according to claim 1, wherein the reference position is canceled when the screen on which the item is displayed is switched to another screen.

6. The apparatus according to claim 1, wherein the electronic apparatus is a digital camera and the display unit is in a view finder.

7. A method of controlling an electronic apparatus comprising:
    detecting touch operations including a touch-down operation, a touch-move operation and a touch-up operation performed on a touch panel;
    performing control to display an item on a screen of display unit while moving the item from a reference position according to an amount of movement from the touch-down position based on the touch-down operation detected on the touch panel to the touch-move position based on the touch-move operation detected on the touch panel;
    updating the reference position with the touch-up position after the touch-move operation is detected and the touch-up operation is detected,
    moving the item from the reference position and displaying the item on the screen of the display unit even when no movement is made from the touch-down position to the touch-up position in a case where the touch-down operation and the touch-up operation are newly detected on the touch panel and the touch-up position based on the detected touch-up operation is an end portion of the touch panel,
    wherein the touch panel is separated from the display unit.

8. A non-transitory computer-readable storage medium storing a program for causing a computer to execute a method of controlling an electronic apparatus comprising:

detecting touch operations including a touch-down operation, a touch-move operation and a touch-up operation performed on a touch panel;

displaying an item on a display unit while moving the item from a reference position according to an amount of movement from the touch-down position based on the touch-down operation detected on the touch panel to the touch-move position based on the touch-move operation detected on the touch panel;

updating the reference position with the touch-up position after the touch-move operation is detected and the touch-up operation is detected, moving the item from the reference position and displaying the item on the screen of the display unit even when no movement is made from the touch-down position to the touch-up position in a case where the touch-down operation and the touch-up operation are newly detected on the touch panel and the touch-up position based on the detected touch-up operation is an end portion of the touch panel, wherein the touch panel is separated from the display unit.

* * * * *